May 24, 1960  R. B. ODDEN  2,938,203
ELECTRONIC DISTANCE MEASURING DEVICE
Filed Nov. 10, 1954  5 Sheets-Sheet 1

INVENTOR.
ROBERT B. ODDEN
BY
George A. Gust
ATTORNEY

May 24, 1960 R. B. ODDEN 2,938,203
ELECTRONIC DISTANCE MEASURING DEVICE
Filed Nov. 10, 1954 5 Sheets-Sheet 5
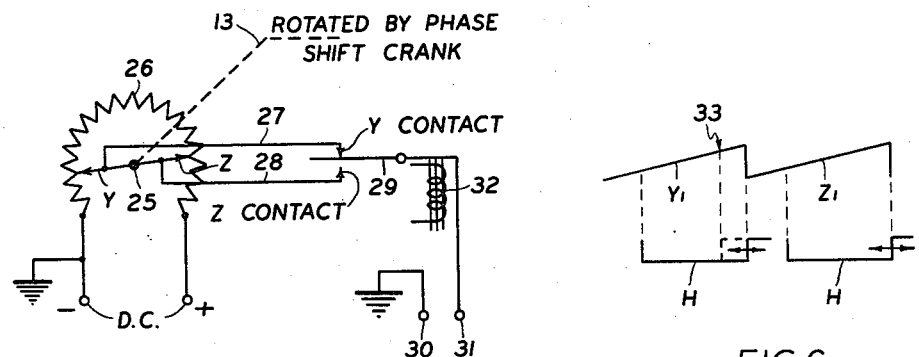
FIG.5
FIG.6
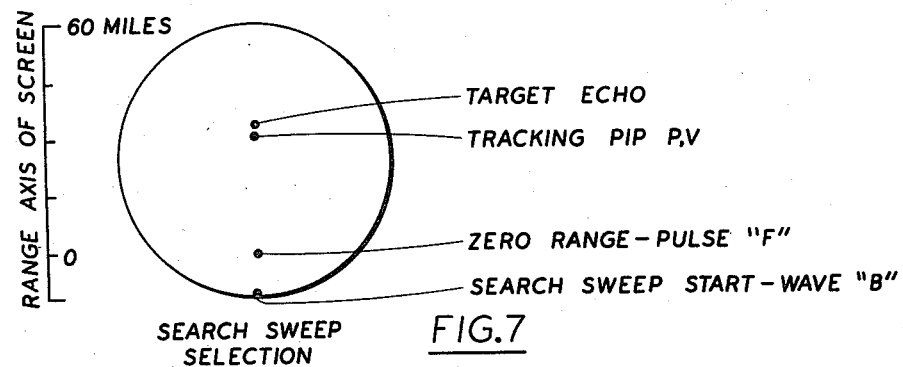
FIG.7
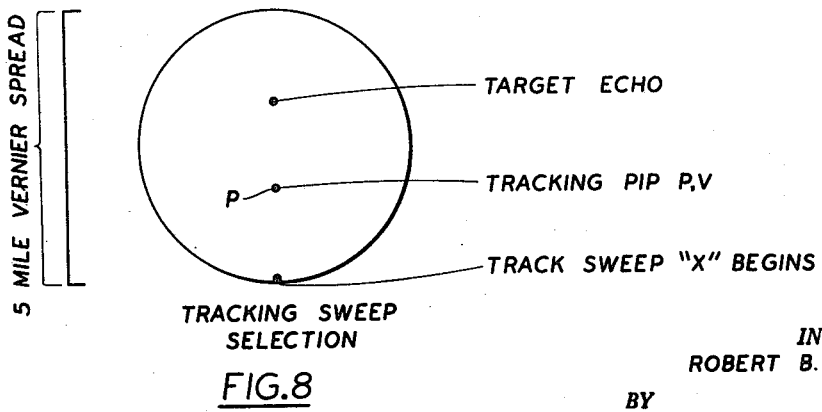
FIG.8
INVENTOR.
ROBERT B. ODDEN
BY
George L. Gust
ATTORNEY

United States Patent Office 2,938,203
Patented May 24, 1960

2,938,203

ELECTRONIC DISTANCE MEASURING DEVICE

Robert B. Odden, Buffalo, N.Y., assignor to International Telephone and Telegraph Corporation Filed Nov. 10, 1954, Ser. No. 467,912

7 Claims. (Cl. 343—13)

The present invention relates to an electronic distance-measuring system, and more particularly to a system adapted for use in connection with radio-ranging apparatus.

In the use of certain types of radio-ranging apparatus, the range of the target from the radar transmitter is visibly indicated on the display screen of an oscilloscope device. On such display screen, the range measurement is made between a fixed impulse or pip which occurs simultaneously with the transmission of the main signal by the radar transmitter, and a target "echo" which is speced from the transmitted impulse a distance corresponding to the target range. As is well-known, this spacing on the display screen may be directly calibrated in terms of lineal measurement, such as miles, so that an operator can immediately determine the target range.

For certain radar applications, it is desirable and oftentimes essential that the range of the target be determined with the greatest degree of accuracy, and it is a principal object of this invention to provide a system which enables the measurement of target range with a high degree of accuracy.

It is another object of this invention to provide a target range-measuring system which inherently produces an accurately calibrated measuring signal for use in establishing the range of a target.

It is still another object to provide a target range-measuring system which inherently generates a target-tracking signal manually adjustable and accurately calibrated to provide a direct indication of target range.

It is another object of this invention to provide a target range-measuring system which generates a target-tracking signal for impression on the display screen of a radar receiver, which is adjustable into coincidence with a target "echo" for providing an indication of target range directly readable in terms of lineal measurement.

It is a still further object to provide a unique signal-synchronizing system for maintaining an accurately calibrated range-measuring relationship between a given radar-triggering impulse and an adjustable targe distance-measuring impulse whereby adjupstment of the latter may be utilized to indicate directly the target distance.

It is still a further object to provide in range-measuring-apparatus relatively long and accurately timed signal delay circuits for obtaining necessary synchronization between a target-measuring impulse and a radar-triggering signal.

In accordance with the principles of this invention, there is provided in range-measuring apparatus a first source of fixed phase impulses, a second source of adjustable phase impulses, means for synchronizing the occurrence of both source impulses, and means for determining the phase relationship between both source impulses with a high degree of accuracy.

For a better understanding of this invention and other and further objects thereof, reference is made to the accompanying drawings, the scope of the invention being defined by the appended claims.

In the drawings:

Fig. 5 is a circuit diagram of a control used in adjusting certain circuits of the preceding figures;

Fig. 6 illustrates wave forms derived from the operation of the device of Fig. 5;

Fig. 7 is a front elevation of a radar display screen showing a target echo and tracking pip in searching relationship; and Fig. 8 is a similar elevation of the display screen with the target echo and tracking pip shown in tracking relationship.

*General description*

Figure 1A:
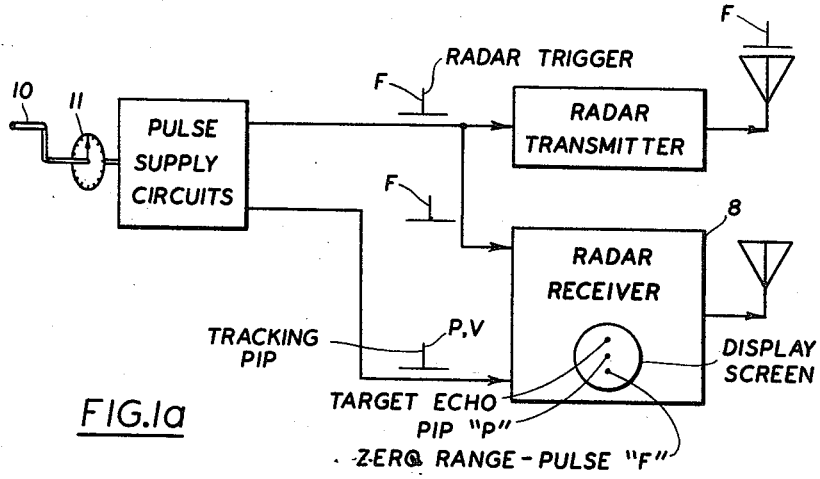
Fig. 1(a) is a block diagram of a complete radar system incorporating the present invention.

Referring to the drawings, and in particular to Fig. 1a, a complete radar system comprising this invention is generally shown in block diagram. The radar transmitter and radar receiver portions thereof are conventional, but are controlled in operation by the circuitry contained in the block labeled "pulse supply circuits." These "pulse supply circuits" supply two different trains of pulses, namely the radar triggering pulses "F" and the tracking pulses or pip "P" (a feature of this invention). The triggering pulses "F" are utilized to trigger the transmitter in the conventional manner into emitting an impulse which may be directed toward a distant target. The tracking pip "P" is supplied only to and utilized only by the radar receiver, as will be explained in detail hereinafter.

The transmitted impulse "F" upon striking the target is reflected back to the radar receiver where it is displayed on the screen of the customary cathode ray tube, as illustrated in detail by Figs. 7 and 8. An operator of the radar equipment will observe the zero range point (corresponding to triggering of the transmitter by impulse "F") on the radar screen, as illustrated, and will also see the "target echo" as illustrated. Knowing the propagation characteristics of radio waves and the timing constants of the radar mechanism, the spacing between the zero range impulse ("F") and the "target echo" may be calibrated in terms of lineal measurement such as miles and a crude method for interpreting this spacing would be to measure it by means of an ordinary ruler or yardstick marked in inches.

Instead of using such a crude method for determining the target range, this invention provides a unique system of obtaining the target range directly from a drum 11 which may be directly calibrated in miles. This drum is operated by means of a crank 10 which serve to control the phase relationship of the tracking pip "P" with respect to the radar trigger "F," such that rotation of the crank 10 may serve to move the tracking pip "P" as it appears on the display screen of the radar receiver between the zero range point "F" and the target echo. Rotation of crank 10 to a point at which the pip "P" is superimposed on the target echo will serve to provide a direct reading of target range on the drum 11. Thus the only, operation required by the operator is to detect a target, then rotate the crank 10 until the tracking pip "P" coincides with the target echo, after which a direct range reading may be obtained.

Figure 1:
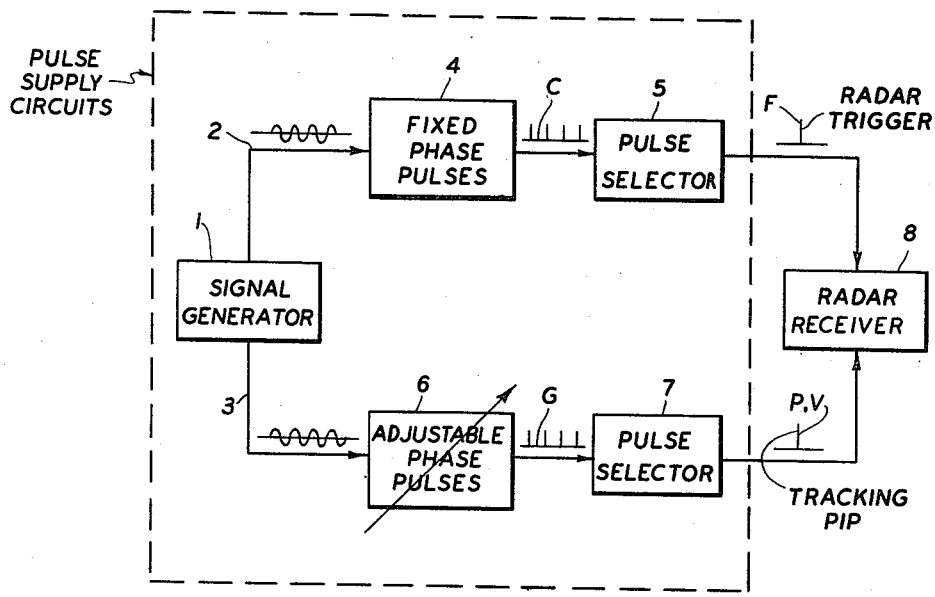
Fig. 1 is a simplified block diagram of one embodiment of this invention.

Considering in more detail the system contained in the block of Fig. 1(a), labeled "pulse supply circuit," reference is made to Fig. 1 wherein a signal generator 1 serves to generate a stable frequency sine wave which is fed into two different channels 2 and 3, respectively. Channel 2 may be characterized as the "fixed phase" channel and serves by means of the impulse shaper 4 to produce fixed frequency impulses C in exact synchronism with the aforesaid sine wave. These impulses C are fed to a pulse selector 5 so designed as to select a particular one of the impulses, such as the one indicated by reference letter F. As stated previously, this impulse F is used to trigger the radar transmitter and may, for all practical purposes, be considered as the base or zero reference signal which appears on the display screen of Fig. 7.

The other channel 3 contains a combination phase-adjusting and impulse-shaping device 6 which produces impulses G in response to the original sine waves. As in the case of channel 2, another pulse selector 7 serves to select a particular one of the impulses G, such as the one indicated by the reference letters P and V. By adjustment of the device 6, the impulses G, and consequently the selected impulse P, may be varied in phase with respect to the fixed phase or reference impulses C and F, respectively. Both selected impulses F and P are fed into a radar receiver 8 which provides an indication of the phase spacing therebetween. It is the system and mechanism for generating and controlling this tracking pip P which constitutes the basis of this invention.

Figure 2:
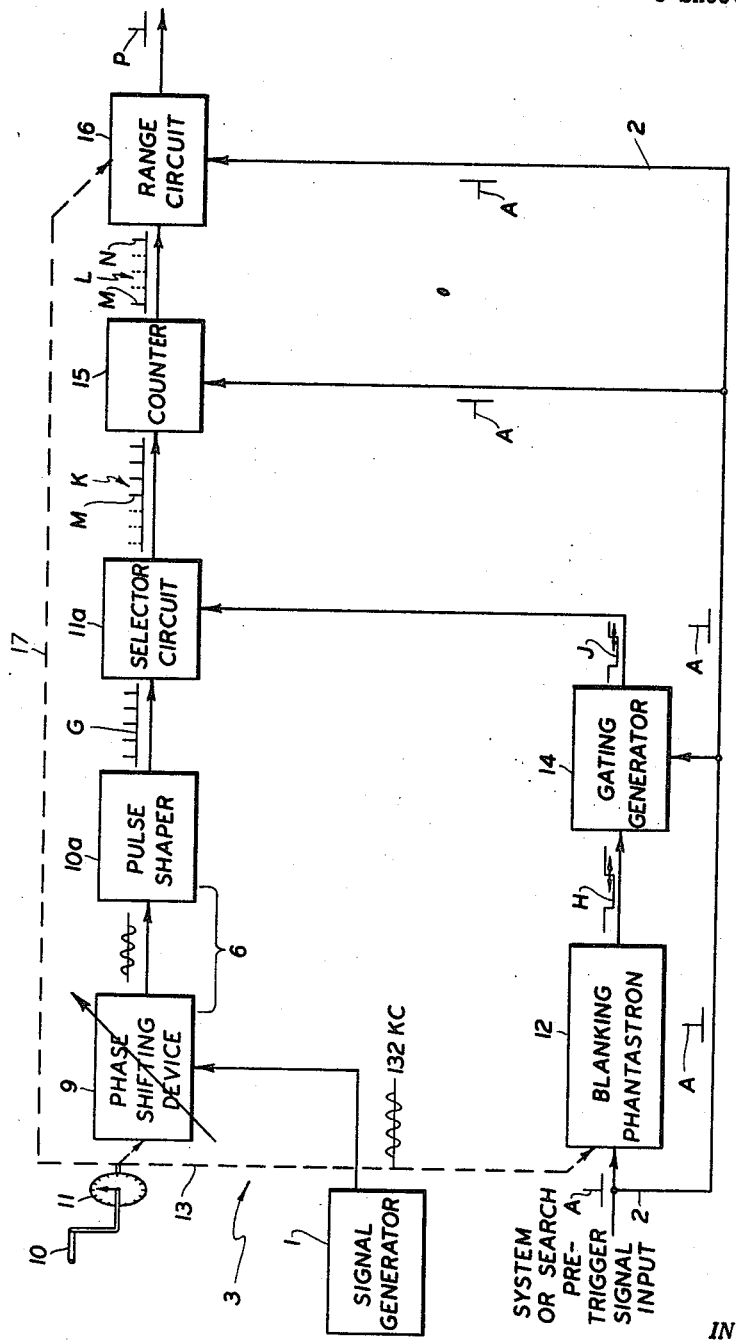
Fig. 2 is a more detailed block diagram of Fig. 1.

Referring now to Fig. 2, like numerals will represent like devices. This figure is devoted primarily to a detailed illustration of the adjustable phase channel 3 of Fig. 1, since the details of the fixed phase channel, represented by numeral 2, may be considered as obvious to a person skilled in the art. This channel 3 comprises a phase shifting device 9 equipped with a manually rotatable crank 10 and a suitable range-indicating scale 11 which operates in response to the rotation of the crank 10. The sine wave output of the oscillator 1 is fed to this phase shifting device 9 which in turn delivers the same sine wave at the selected frequency of, for example, approximately 132 kilocycles to a pulse shaper 10a which generates a series of equally spaced impulses G corresponding to this frequency. The phase of the sine wave delivered by the phase shifting device 9 is varied merely by rotation of the crank 10, and any precision device known to the art may be used for this purpose. One suitable device, commercially available, bears the trademark "Varigon" and comprises essentially a variable condenser having four electrically separated stator sections in spaced quadrature. Rotation of the rotor serves to advance or retard the phase of the sine wave signal fed thereto through a phase-splitting network similar to the one shown by Fig. 16, pages 3–32, in "Principles of Radar," by Radar School, Massachusetts Institute of Technology, 1946.

The impulses G are next fed to a suitable selector circuit 11a, which in operation merely conducts these impulses G through to the output circuit, this conduction being momentarily interrupted in a manner which will be explained in the following. Essentially, this selector circuit 11a may comprise a vacuum tube having two control grids to one of which is applied the signals G and to the other of which is applied a control signal which determines whether or not the tube is conductive.

The phase shifted sine wave from device 9 is also operatively coupled to a blanking phantastron 12. This blanking phantastron is conventional in design and serves to produce a blanking wave H which may be adjusted in width, as indicated. One of the fixed impulses of wave train C of the channel 2 (Fig. 1), which precedes the selected impulse F of the same wave train, is indicated by the reference letter "A" throughout the drawings and in Fig. 2 is shown as being fed into the blanking phantastron 12. This signal "A" serves to initiate operation of the phantastron to produce the wave H, and the leading edge of the latter may be considered as occurring simultaneously with the application of the signal "A."

As explained before, the wave H is adjustable in duration, this adjustment being afforded by a suitable rotary mechanical connection 13 coupled to the crank 10.

The wave H is next coupled into a gating generator 14 which serves to produce a wave J corresponding almost identically to the wave H. The signal "A" is also fed to this gating generator 14 and serves to initiate the wave J. The trailing edge of the wave H is utilized to determine the trailing edge of the wave J, thereby making the waves H and J almost identical as to duration. The gating generator 14 comprises a conventional multivibrator circuit and serves in the system essentially as a buffer between the blanking phantastron 12 and the succeeding circuitry.

The blanking wave J is next coupled into one grid circuit of the selector 11a and is operative to trigger the latter into a non-conductive state so as to prevent the conduction of impulses G during the period of time the wave J occurs. By lengthening or shortening the wave J in response to adjustment of the crank 10, the particular number of impulses G, which are blanked from the selector 11a output, may be determined.

The series of selected impulses, indicated by the reference letter K, are next fed to a counting device 15, which is essentially a frequency dividing circuit, for producing a single output pulse for every predetermined number, such as four, of pulses K fed thereto. In the illustrated embodiment, this counter 15 is designed to provide a frequency division of four, and this frequency division is illustrated graphically in Fig. 4 by the wave forms identified by the letters K and L. One essential design feature of the counter is that it should pass the first impulse M of the wave train K, this first impulse M being the one next succeeding the trailing edge of the wave J. This first impulse is indicated in Fig. 2 by the letter M, the dashed line impulses next preceding this impulse M not actually appearing in the selector 11a output and being illustrated only to show those impulses eliminated by wave J. The radar transmitter pre-triggering signal "A," as taken from the channel 2, serves to set the counter 15 so that it will conduct the first impulse of the train selected by the selector 11a, but after this particular selection, the counter 15 produces succeeding impulses which occur at the rate of one impulse to every four of the selected impulses K. These counted impulses L are indicated by the letters M, N, O and P in Fig. 4. A suitable counter 15 is illustrated and described on page 164, section 5–4, volume 19, of Radiation Laboratory Series entitled "Waveforms," and published in 1949. This reference discloses a two-count circuit which is simply converted into a four-count circuit by connecting two of the illustrated circuits in cascade or series.

These counted impulses L are next coupled into a ranging circuit 16 which operates to select, for example, only the impulse P therefrom. This ranging circuit, illustrated in more detail in Fig. 3, has a connection 17 from the range crank 10 and an electrical coupling which conducts the pre-trigger "A" thereto. The circuit is so designed that regardless of the adjusted position of the crank 10, only the impulse P will be selected from the train L, and the method of accomplishing this selection will be explained in the following. It should be noted, however, at this point that by adjustment of the range crank 10, the impulse P may be varied in phase with respect to a fixed phase or reference signal F, as explained in connection with Fig. 1.

*Description of range circuit 16*

Figure 3:
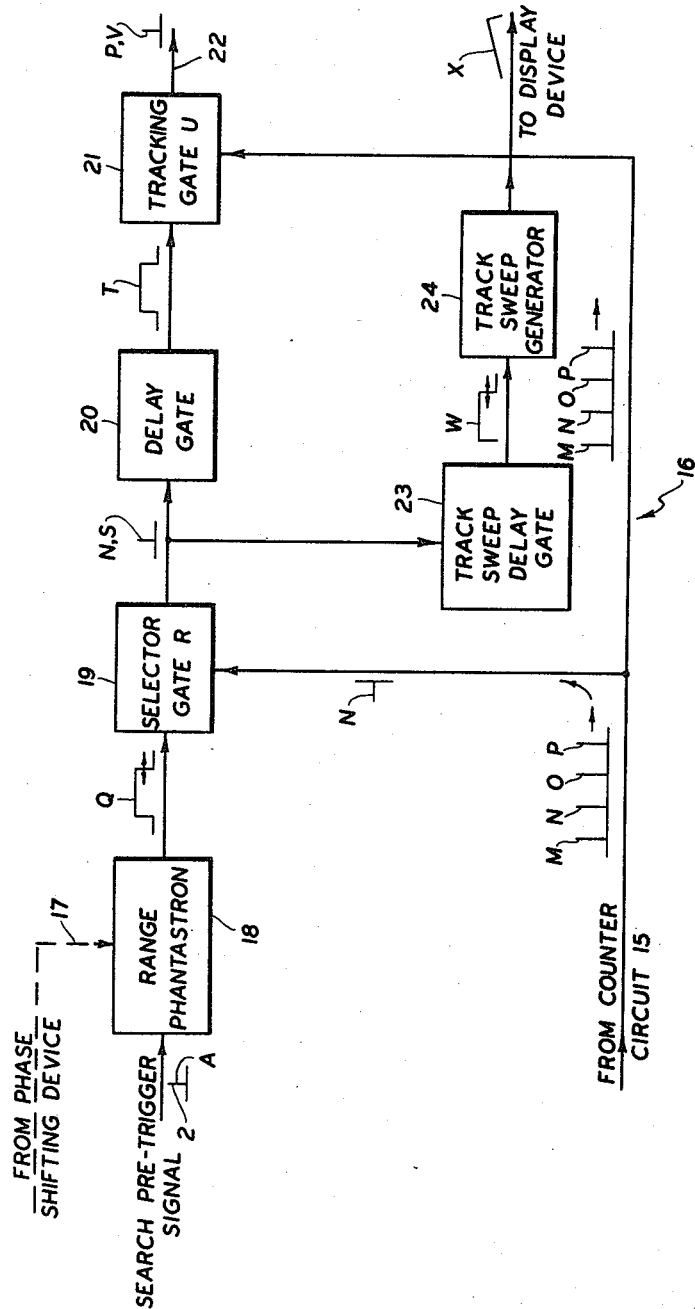
Fig. 3 is a block diagram of the range circuit portion of Fig. 2.

Referring now to Fig. 3, the range circuit represented by the single block 16 of Fig. 2 contains a range phantastron 18 which is similar in construction and operation to the blanking phantastron 12 as described hereinabove. The pre-triggering signal A is fed to the range phantastron 18, which is operative to produce in response thereto a square wave Q adjustable in duration by means of the range crank connection 17. This adjustable wave Q is next coupled to a selector gate 19 arranged to generate a wave R (see Fig. 4) in response to the trailing edge only of the wave Q. The train of timing waves M, N, O, P from the counter circuit 15 is also fed to the selector gate 19 and the gating wave R generated by the latter serves to conduct only the wave N of the train, as indicated. This selected wave N causes operation of the delay gate 20, which now produces a wave T of predetermined duration. This wave T is coupled to a tracking gate U which has also fed thereto the timing wave train M, N, O, P. The delay gate signal T is so formed as to occur simultaneously with the timing wave O, and the tracking gate circuit U is made conductive only during the application thereto of the wave T. By means of this conductive condition, only the wave P is conducted through to the range output circuit 22. It will now be appreciated that the purpose of the system, illustrated by Figs. 2 and 3, is to select a particular wave, wave P, out of a series of phase adjustable waves, irrespective of the phase adjustment effected by rotation of the range crank 10.

An auxiliary sweep signal X occurring in exact synchronism with the impulse P is produced for providing vernier adjustment for locating the target echo on the display screen of Fig. 8 more accurately, and if this vernier illustration of Fig. 8 will be compared with the drawing of Fig. 7, it will be noted that the sweep across the display screen is equivalent to five (5) miles distance as compared to sixty (60) miles in Fig. 7. The circuit for generating the sweep wave X comprises essentially a track sweep delay gate 23 coupled to the output circuit of the selector gate 19, which operates in response to the impulse N (see Fig. 4) to produce a gating wave W. Preferably, this delay gate 23 comprises a one-shot multivibrator which is adjustable to position the trailing edge of the wave W as needed. This trailing edge of the wave W is utilized by a track sweep generator 24 to produce the linear saw-tooth wave X, this sweep generator being of any suitable design and having such time constants as is necessary to provide a five (5) mile sweep on the screen of Fig. 8.

*Further description of system components*

The pulse shaper 10a may be of any conventional design and preferably is operable to produce an impulse of predetermined width each time the sine wave from the phase-shifting device 9 crosses the time axis.

Both of the phantastron circuits 12 and 18 consist of well-known multivibrators which operate in response to a single triggering signal to produce a single square wave of predetermined, timed duration, this multivibrator producing only one square wave for each triggering signal. The characterizing feature of the phantastron circuit is the fact that the length of the output square wave may be adjusted manually, whereas the usual one-shot multivibrator has a wave output which is normally fixed in duration. Suitable phantastron circuits are described in detail in "Principles of Radar," by the Radar School, Massachusetts Institute of Technology, 1946.

Referring now to Fig. 5, a unique arrangement for controlling the width of the phantastron wave H will be described. This control comprises a rotor 25 coupled for rotation by crank 10, carrying two arms Y and Z mutually insulated from each other. These arms bear contacts which slidably engage a conventional rheostat resistance 26 adapted to have connected across the ends thereof a D.C. voltage of predetermined amplitude. Two wires 27 and 28 lead from the respective arms Y and Z and terminate in stationary contacts positioned opposite an electromagnetic relay armature 29. A pair of terminals 30 and 31 provide an output voltage from the control by means of a wire leading from the terminal 31 to the relay armature 29 and another wire which grounds the terminal 30.

Assuming the armature to be in the position illustrated, gradual rotation of the arms Y and Z in a clockwise direction will serve to generate a wave across the terminals 30 and 31, which appears as the wave $Y_1$ in Fig. 6. Of course, the linearity of this wave $Y_1$ will depend upon the uniformity of the resistor 26.

Now if the rotation is continued and the relay 32 is energized so as to shift the armature 29 into contact with the wire 28 leading to arm Z, and this arm Z is electrically transposed with the arm Y, a wave $Z_1$ (Fig. 6) will be developed. In shifting the armature 29 between the two arms Y and Z in response to rotation of the latter, the relay 32 is energized when the wave Y or Z attains a predetermined amplitude. These waves Y and Z are used adjustably to control the operation of the phantastron 12 by application thereof to the tube control grid, such that the position of the trailing edge of the wave H is determined by the adjusted amplitude of the particular wave Y or Z. Assuming that the arm Y is positioned to provide a voltage indicated by point 33 in Fig. 6, the wave H will have a width as indicated by the dashed lines. Thus, in starting from the zero voltage point on the wave Y and progressively increasing the amplitude of the voltage, the width or trailing edge of the wave H may be correspondingly changed. By using two arms Y and Z, the wave H may be made to widen to a maximum point and then almost instantaneously return to zero at the time of changing from the wave Y to the wave Z in preparation for another wave H lengthening. The importance of this control of wave H length will become apparent from the following description.

The gating generator 14, as explained earlier, produces its wave J in response to the pre-trigger signal A and terminates this signal J in response to the trailing edge of the wave H. It corresponds in circuit arrangement and operation to a Schmidt multivibrator which is well-known in the art.

The counter circuit 15 may be of any conventional counter design, similar to those used in electronic computers, which will produce a single impulse for a given number of input impulses. In the illustrated embodiment, the circuit is so arranged as to produce one impulse for every four impulses fed thereto, with the exception that it will produce an impulse in response to the first impulse of the wave train delivered by the selector circuit 11. This selection of the first impulse is made possible by utilizing the pre-trigger signal A as a substitute for three impulses of the wave train K so that the next succeeding impulse, which is the first one of the wave train K passed by the selector circuit 11, will pass through. Thereafter, no further signals A are allowed to occur, so that every fourth impulse of the train K will be counted and passed by the counter 15. These four-count impulses are identified as M, N, O and P in Fig. 4.

The selector gate 19 (Fig. 3) is preferably a multi-vibrator circuit so designed as to be triggered into operation only upon the occurrence of the trailing edge of the phantastron wave Q and is made of such duration as to coincide symmetrically with the occurrence of the second impulse N of the counter output L.

The delay gate 20 is a similar multivibrator triggered into action by the impulse N which is conducted by the selector gate 19, and the duration of the gating wave, indicated by the letter T, is designed to terminate midway between the occurrence of timing impulses O and P. The tracking gate 21 may also be a multivibrator circuit which responds only to the trailing edge of the delay gate wave T, and the signal thereby produced is a square wave of such duration as to be approximately equal to the spacing between the four-count impulses of the wave train L. As will be seen more clearly in Fig. 4, this gating wave U (generated by gate 21) symmetrically straddles in phase the counter impulse P.

*Explanation of Wave Forms*

Figure 4:
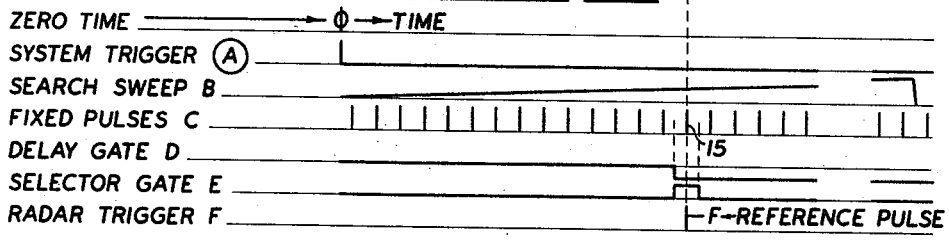
Fig. 4 is a series of wave forms used in explaining the invention.
Figure 4:
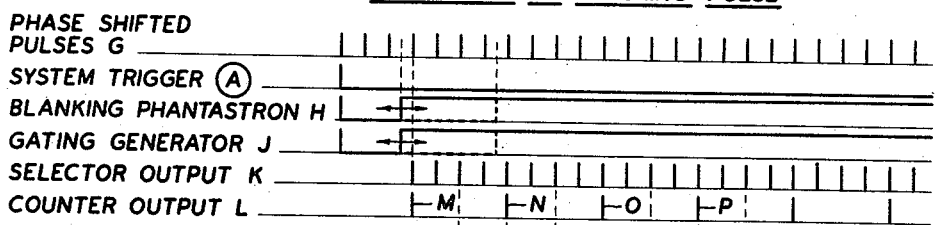
Figure 4:
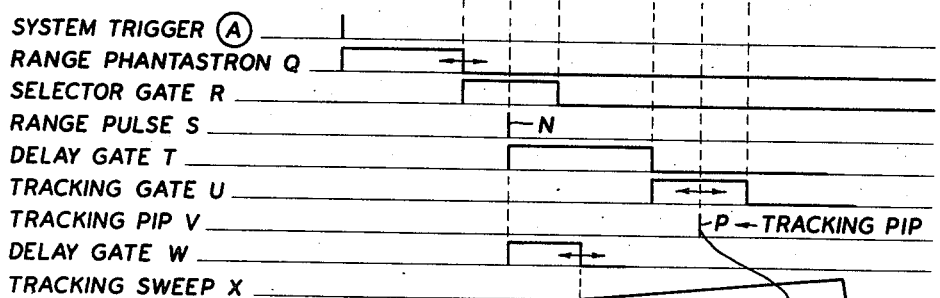

Referring to Fig. 4, the left-hand ordinate designates zero time only insofar as system-triggering operation is concerned. This zero time is not to be confused with the reference point on the display screen of Figs. 7 and 8. The difference between this system reference and the display screen reference will become apparent from the following description.

Considering waves A through F in conjunction with the channel 2 of Fig. 1, the system trigger impulse A is derived from an external impulse-generating circuit having a repetition rate, for example, of approximately 800 impulses per second. This system trigger A is used to initiate a search sweep saw-tooth wave B which provides, for example, a 60-mile range sweep, as illustrated in Fig. 7. The fixed impulses C are dependent upon and derived from the stable oscillator 1 (Fig. 1) and have a spacing of approximately 7.6 microseconds between successive impulses. It is one of these impulses C which is utilized as the radar transmitter trigger or reference signal, and this particular impulse is indicated in Figs. 1 and 7 by the reference letter F. This impulse F is selected by means of a signal-selecting circuit which first produces a gating wave D terminating after the occurrence of a predetermined number of the impulses C, such as fourteen (14) such impulses, to initiate a gating wave E having a duration of such length as to coincide only with the selected impulse F as shown. This selected impulse F is now used by the radar system to provide the reference point on the display screen, as illustrated in Fig. 7.

As explained earlier, the spacing between the target echo on the radar screen (Fig. 7) and the radar triggering impulse F may be converted into target range in miles or the like. Instead of actually measuring this spacing on the screen and then converting this measurement into range figures, this invention provides a unique arrangement of indicating such range directly. Such direct indication is made possible by superimposing the tracking impulse P onto the radar screen and referencing this impulse P against the zero range impulse F. By operating the crank 10 of Fig. 2, this impulse on tracking pip P (Fig. 7) may be moved along the vertical sweep line between triggering impulse F and the target echo. When the pip P is superimposed onto the target echo, the target range may be read directly from the indicator 11. The method of accomplishing this direct reading is graphically illustrated by the remaining wave forms and will now be explained.

The phase shifted impulses G which originate from the oscillator 1 and which, therefore, occur at the same rate as the fixed impulses C (Fig. 1) may be advanced in phase any desired number of degrees by merely rotating the crank 10. Upon the occurrence of the system trigger A (occurring at a rate of 800 pulses per second) the blanking phantastron H is caused to generate a blanking wave which is used to generate an identical wave by the gating generator 14. Depending upon the adjustment of the rotor 25 (Fig. 5) as determined by the adjustment of the crank 10, the waves H and J may have a width as illustrated. When fed to the selector circuit 11a, the wave J eliminates the first three phase shifted impulses G, as illustrated, thereby providing a train of impulses, indicated by the letter K. Insofar as the system is concerned, all operation following hereafter is referenced against the first impulse of this series K, this first impulse always being the one next succeeding the trailing edge of the wave J.

This wave train K is divided in frequency by four by the counter 15, as explained previously, and thereby produces the spaced timing waves M, N, O, P, as illustrated. These timing waves are relatively widely spaced apart and are very stable since their occurrence depends primarily upon the stability of the signal generator 1. By making the spacing between these impulses of such width, it is relatively easy thereafter to select any given one of these impulses without minor circuit instabilities causing accidental or improper selection of more than the one desired impulse usually evidenced by the well-known "pulse jitter" phenomenon.

By rotating the range crank 10 from the position indicated by the waves H and J in Fig. 4 in a direction to advance the phase of the impulses G, the trailing edge of these waves H and J are caused to advance in exact synchronism therewith. Rotation of the crank 10 through an angle of 360 degrees serves to move the trailing edge of the waves H and J to the dashed line positions and correspondingly to advance the timing waves M, N, O and P the same amount. This 360 degree position corresponds to one complete saw-tooth wave of Fig. 6. If the rotation is continued so as to move the crank through an additional degree of rotation, the control of Fig. 5 will operate to produce a new saw-tooth control wave, starting at zero voltage, which causes the blanking phantastron wave H to return to its full line position (Fig. 4). This return coincides in phase exactly with four impulses of the train G and thereby in effect does not disturb the advanced phase position or occurrence of the counter output counting waves M, N, O, P. Thus, the trailing edges of the waves H and J may be simply considered as pushing the timing wave train M, N, O, P outwardly in phase as the range crank 10 is advanced, this outward progression occurring in groups of four impulses of the train G.

For zero range adjustment, the selected impulse P is seen to coincide in time with the occurrence of the radar triggering impulse F and this condition is observed on the radar screen by the superimposition of the tracking pip P on the trigger F.

Having now described a method of generating and advancing the phase of the counter output L, it is now necessary to select the particular impulse P and to present it on the radar screen regardless of the phase position at which the crank 10 may be rotated. This is accomplished by means of the range circuit 16, as illustrated in detail in Fig. 3.

The pre-trigger A (occurring at the rate of 800 pulses per second) initiates the wave Q by the range phantastron 18. The width of this impulse Q is varied in accordance with the adjustment of the range crank 10 and will progressively widen in response to continued adjustment of the crank 10. The trailing edge of this wave Q is designed to fall in between the timing waves M and N and since this trailing edge varies in response to phase adjustment, this synchronized position will never vary.

The trailing edge of the wave Q initiates the selector gate wave R, which is designed to coincide only with the occurrence of the timing wave N. This timing wave R causes the selector gate 19 to conduct the timing wave or range impulse S (corresponding to timing wave N) which is next utilized to trigger the delay gate 20 into generating the gating wave T. As will be seen in Fig. 4, the trailing edge of this wave T terminates midway between timing waves O and P. The trailing edge of this wave T next triggers the tracking gate 21 into operation for producing the tracking wave U. This wave U is now used to gate through or conduct the impulse P to the output circuit 22 (Fig. 3).

Since the wave Q of the range phantastron 18 is in phase synchronism with the timing waves L as the range crank 10 is operated, it is now apparent that the tracking gate U must and will move also in phase synchronism with the wave P. The ranging circuit 16 (Fig. 3) may now be simply characterized as a synchronized delay system which is operative to select a particular one of a recurring series of high frequency signals.

The range impulse S is also utilized to produce a gating wave W of adjustable width which, in turn, is used to initiate the generation of the track sweep wave X. The circuitry is so arranged that the sweep wave X is initiated by the trailing edge of the gate W whereby it is possible to center the wave X on the radar screen.

Summary of operation

With reference to Fig. 7, when the range crank 10 is adjusted so as to bring the tracking pip P into coincidence with the radar trigger impulse F, the range scale 11 (Fig. 2) will indicate zero miles. Now as the range crank is advanced so as to move the impulses G outwardly (Fig. 4), the tracking pip P will move outwardly toward the assumed target echo. When the tracking pip coincides with the target echo, the range scale 11 will indicate directly, in terms of miles or other suitable indicia of range, the distance to the target. However, since the display screen of Fig. 7 is usually relatively small, in the order of five (5) to seven (7) inches in diameter, a fraction of an inch discrepancy in the adjustment of the tracking pip P will represent a relatively large distance on the scale of indicator 11. This being true, a vernier adjustment is provided which utilizes only the sweep wave X having a time duration corresponding to a distance of five (5) miles (Fig. 8). In shifting from the search sweep of Fig. 7 to the tracking sweep of Fig. 8, the radar receiver is caused to utilize only the tracking sweep X for the full sweep excursion of the display screen. Since the same display tube diameter is now caused to represent a distance of five (5) miles, it is seen that any slight error in the adjustment of the search sweep setting of Fig. 7 will be augmented, as illustrated in Fig. 8, whereby the range crank 10 may be further adjusted so as to move the tracking pip P into coincidence with the target echo. Once this coincidence is achieved, the exact target range will be given directly by the range indicator 11.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. In a system for use in measuring the range of a remote object, first means for transmitting periodically recurring impulses of energy at a first repetition rate, second means for receiving said impulses after reflection from an object, a first source of fixed phase impulses, a second source of adjustable phase impulses, said fixed and adjustable phase impulses having the same repetition rate which is higher than said first repetition rate, third means for selecting one out of every predetermined number of said fixed phase impulses for actuating said transmitting means, means operatively coupled to said second source and responsive to said adjustable phase impulses for producing periodically recurring timing waves having a spacing corresponding to a predetermined number of said adjustable phase impulses, and means for selecting a periodically recurring one out of a predetermined number of said timing waves and for coupling said one timing wave to said receiving means.

2. A system for use in distance-measuring apparatus comprising a source of recurring impulses, a first circuit operatively coupled to said source and being normally conductive of said impulses, a second circuit operatively coupled to said first circuit and producing spaced blanking signals of predetermined duration, means responsive to each blanking signal for rendering said first circuit non-conductive for a corresponding period of time, said first circuit conducting said impulses only during the intervals between blanking signals, an impulse-counting circuit operatively coupled to said first circuit and operating in response to said conducted impulses to provide periodically recurring timing waves, each timing wave corresponding to a predetermined number of said conducted impulses, phase-adjusting means operatively coupled to both said source and said circuit for varying synchronously the phase of said impulses and the duration of said blanking signals, means responsive to a periodically recurring one out of a predetermined number of said timing waves for generating a correspondingly recurring gating signal in time coincidence with a succeeding periodically recurring timing wave, and means responsive to said gating signal for selecting only said succeeding timing wave out of all of said timing waves.

3. An impulse generating and selecting system comprising a source of impulses which are continuously adjustable in phase, circuit means operatively coupled to said source for selecting a particular one of said impulses; said circuit means comprising a counter for producing a plurality of equally spaced timing waves in response to a predetermined greater number of said impulses, means responsive to a periodically recurring one out of every predetermined number of said timing waves for producing a correspondingly recurring gating signal in time coincidence with a periodically recurring succeeding timing wave, means for synchronously varying the phase of said gating signal and said timing waves, and means responsive to said gating signal for selecting only said succeeding timing wave out of all of said timing waves.

4. An impulse generating and selecting system comprising a source of impulses which are continuously adjustable in phase, circuit means operatively coupled to said source for selecting a particular one of said impulses; said circuit means comprising frequency dividing means which produces a periodically recurring timing wave in response to every predetermined number of said impulses whereby a continuous train of spaced timing waves are provided, a signal-producing circuit operatively coupled to said frequency dividing means and operative to produce a periodically recurring gating signal in response to said timing wave, said gating signal occurring simultaneously with a succeeding periodically recurring timing wave, phase-shifting means operatively coupled to both the signal-producing circuit and the source of impulses for shifting synchronously the phase of said gating signal and said impulses, and a gating circuit coupled to said signal-producing circuit and said frequency dividing means and responsive to said gating signal for selecting said succeeding timing wave.

5. A system for use in distance-measuring apparatus comprising a source of recurring impulses, a first circuit operatively coupled to said source and being normally conductive of said impulses, a second circuit operatively coupled to said first circuit and producing spaced blanking signals of predetermined duration, means responsive to said blanking signals for rendering said first circuit non-conductive for a period of time corresponding to the duration of each blanking signal, said first circuit conducting said impulses only during the intervals between blanking signals, an impulse-counting circuit operatively coupled to said first circuit and operating in response to said conducted impulses to provide periodically recurring timing waves, each timing wave corresponding to a predetermined number of said conducted impulses, phase-adjusting means operatively coupled to both said source and said second circuit for varying synchronously the phase of said impulses and the duration of said blanking signals, and wave selecting circuitry operatively coupled to said impulse-counting circuit for selecting a periodically recurring one out of every predetermined number of said spaced timing waves.

6. A system for use in distance-measuring apparatus comprising a source of recurring impulses and being normally conductive of said impulses, a first circuit operatively coupled to said source, a second circuit operatively coupled to said first circuit and producing blanking signals of predetermined duration, means responsive to each blanking signal for rendering said first circuit non-conductive for a corresponding period of time, said first circuit conducting said impulses only during the intervals between blanking signals, an impulse-counting circuit operatively coupled to said first circuit and operating in response to said conducted impulses to provide periodically recurring timing waves, each timing wave corresponding to a predetermined number of said conducted impulses, phase-adjusting means operatively coupled to both said source and said second circuit for varying synchronously the phase of said impulses and the duration of said blanking signals, and wave-selecting circuitry operatively coupled to said impulse-counting circuit for selecting one out of every predetermined number of said spaced timing waves; said wave-selecting circuitry comprising a gating-signal generator also operatively coupled to said impulse-counting circuit and operative in response to a selected periodically recurring timing wave to generate a gating signal of predetermined duration, and a timing-wave selector circuit operatively coupled to both said gating-signal generator and said impulse-counting circuit and operative in response to said gating signal to select a particular periodically recurring timing wave which succeeds the timing wave used to generate said gating signal.

7. A system for use in distance-measuring apparatus comprising a source of recurring impulses, a first circuit operatively coupled to said source and being normally conductive of said impulses, a second circuit operatively coupled to said first circuit and producing blanking signals of predetermined duration, means responsive to said blanking signals for rendering said first circuit non-conductive for a period of time corresponding to the duration of each blanking signal, said first circuit conducting said impulses only during the intervals between blanking signals, an impulse-counting circuit operatively coupled to said first circuit and operating in response to said conducted impulses to provide periodically recurring timing waves, each timing wave corresponding to a predetermined number of said conducted impulses, phase-adjusting means operatively coupled to both said source and said second circuit for varying synchronously the phase of said impulses and the duration of said blanking signals, and wave-selecting circuitry operatively coupled to said impulse-counting circuit for selecting one out of every predetermined number of said spaced timing waves; said wave-selecting circuitry comprising a gating-signal generator also operatively coupled to said impulse-counting circuit and operative in response to a selected periodically recurring timing wave to generate a gating signal of predetermined duration, and a timing-wave selector circuit operatively coupled to both said gating-signal generator and said impulse-counting circuit and operative in response to said gating signal to select a particular periodically recurring timing wave which succeeds the timing wave used to generate said gating signal, said gating-signal generator also having an operative connection with said phase-adjusting means for adjusting the duration of said gating signal synchronously with the selected timing wave used to generate the gating signal.

References Cited in the file of this patent

UNITED STATES PATENTS

| | | |
|---|---|---|
| 2,471,408 | Busignies | May 31, 1949 |
| 2,614,218 | Hancock | Oct. 14, 1952 |
| 2,636,165 | Hulsizer | Apr. 21, 1953 |
| 2,703,401 | Derdsa | Mar. 1, 1955 |
| 2,713,160 | Trachtenberg | July 12, 1955 |
| 2,776,427 | Bedford | Jan. 1, 1957 |

FOREIGN PATENTS

| | | |
|---|---|---|
| 589,593 | Great Britain | June 25, 1947 |